United States Patent
Enghels

(10) Patent No.: US 9,915,335 B2
(45) Date of Patent: Mar. 13, 2018

(54) METHOD FOR TREATING A COMPONENT SUCH AS A GEARWHEEL

(75) Inventor: Florence Enghels, Courbevoie (FR)

(73) Assignee: HISPANO SUIZA, Colombes (FR)

( * ) Notice: Subject to any disclaimer, the term of this patent is extended or adjusted under 35 U.S.C. 154(b) by 698 days.

(21) Appl. No.: 14/006,249

(22) PCT Filed: Mar. 22, 2012

(86) PCT No.: PCT/FR2012/050602
§ 371 (c)(1),
(2), (4) Date: Sep. 19, 2013

(87) PCT Pub. No.: WO2012/127172
PCT Pub. Date: Sep. 27, 2012

(65) Prior Publication Data
US 2014/0007725 A1    Jan. 9, 2014

(30) Foreign Application Priority Data
Mar. 22, 2011 (FR) .......................... 11 52374

(51) Int. Cl.
C21D 1/10 (2006.01)
F16H 55/06 (2006.01)
(Continued)

(52) U.S. Cl.
CPC ............ *F16H 55/06* (2013.01); *B23F 19/00* (2013.01); *C21D 1/06* (2013.01); *C21D 1/10* (2013.01);
(Continued)

(58) Field of Classification Search
CPC . F16H 55/06; B23F 19/00; C23C 8/22; C23C 8/80; C21D 1/06; C21D 1/10;
(Continued)

(56) References Cited

U.S. PATENT DOCUMENTS 5,009,395 A * 4/1991 Pfaffmann ............... C21D 1/10
266/115
2003/0205297 A1 11/2003 Tipps et al.
(Continued)

FOREIGN PATENT DOCUMENTS

| EP | 1 876 256 | 1/2008 |
|---|---|---|
| EP | 1 980 630 | 10/2008 |
| JP | 8 311607 | 11/1996 |
| JP | 2010001527 A * | 1/2010 |

OTHER PUBLICATIONS

Rakhit, A.K., "Carburizing and Hardening Gears", Heat Treatment of Gears—A Practical Guide for Engineers, 2000, ASM International, p. 33-84.*

(Continued)

*Primary Examiner* — Jessee Roe
(74) *Attorney, Agent, or Firm* — Oblon, McClelland, Maier & Neustadt, L.L.P.

(57) ABSTRACT

A method of manufacturing a mechanical component made of steel including a surface-hardening phase. The method includes creating a rough form of the component with regions to be hardened, then successive case hardening with cooling without quenching, heating to an austenitizing temperature of the steel by induction heating the zones, and quenching.

5 Claims, 1 Drawing Sheet

(51) Int. Cl.
*C21D 1/06* (2006.01)
*C21D 1/42* (2006.01)
*C21D 9/32* (2006.01)
*C23C 8/22* (2006.01)
*C23C 8/80* (2006.01)
*B23F 19/00* (2006.01)

(52) U.S. Cl.
CPC ................. *C21D 1/42* (2013.01); *C21D 9/32* (2013.01); *C23C 8/22* (2013.01); *C23C 8/80* (2013.01); *Y02P 10/253* (2015.11); *Y10T 74/1987* (2015.01)

(58) Field of Classification Search
CPC ........... C21D 1/42; C21D 9/32; Y02P 10/253; Y10T 74/1987
See application file for complete search history.

(56) References Cited

U.S. PATENT DOCUMENTS

| | | |
|---|---|---|
| 2008/0247901 A1 | 10/2008 | Morita et al. |
| 2009/0266449 A1 | 10/2009 | Ohbayashi et al. |
| 2009/0301608 A1 | 12/2009 | Taniguchi et al. |
| 2012/0247249 A1* | 10/2012 | Obayashi .............. H01L 51/052 74/434 |

OTHER PUBLICATIONS

Igawa et al., English machine translation of JP 2010-001527A, Jan. 2010, p. 1-25.*
International Search Report dated Sep. 6, 2012 in PCT/FR12/50602 Filed Mar. 22, 2012.

* cited by examiner

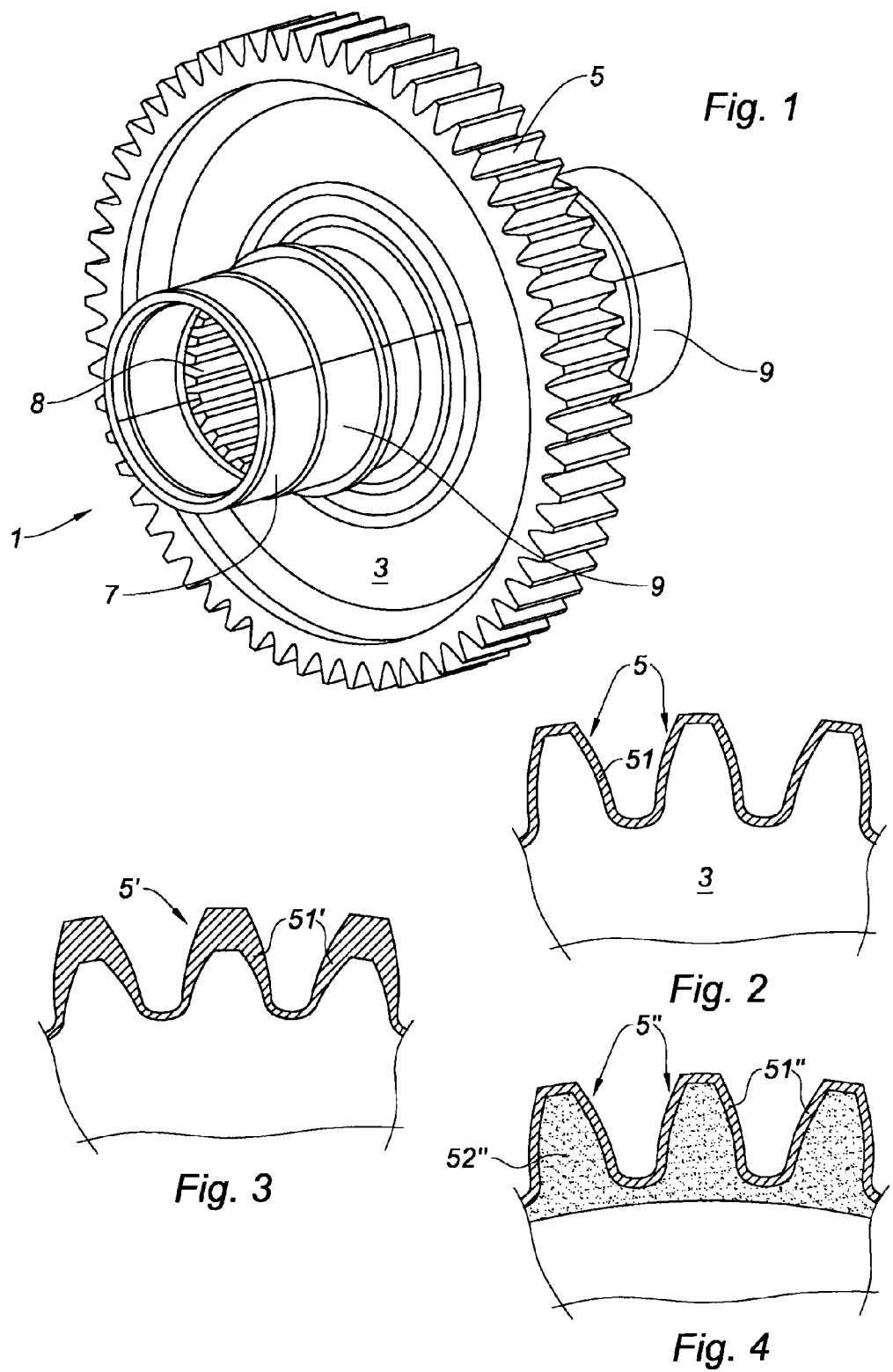

METHOD FOR TREATING A COMPONENT SUCH AS A GEARWHEEL

FIELD OF THE INVENTION

The present invention relates to the field of the treatment of metal components made of steel to make them better able to withstand the loadings to which they are subjected while they are in use. It relates in particular to the treatment of gearwheels.

PRIOR ART

A gearwheel, an example embodiment of which is depicted in FIG. 1, is a mechanical component that transmits rotational load. The gearwheel 1 depicted in the figure comprises a wheel disk 3 with a tooth set 5 formed at its periphery. The wheel disk 3 is extended axially by cylindrical surfaces 7 forming the barrel and which may have external or internal splines 8 and external rolling bearing lands 9. These zones are in contact with other components of a mechanical assembly: the tooth set 5 with the tooth set of another gearwheel, the rolling bearing lands with the inner rings of rolling bearings and the splines with corresponding splines of a transmission shaft for example. Loads are thus transmitted through these zones which are therefore subjected to the highest stresses. Hardening treatments are generally provided to improve their resistance to wear.

The treatment applied to the above zones is generally a surface hardening treatment aimed at improving the hardness and therefore the slip as well as the life of the component.

Treatment of the other zones of the component is optional or in some instances has to be avoided when it is necessary to keep certain surface zones unhardened. This is the case with screw threads, thin zones, zones intended for welding or even the large wheel disks of gearwheels which are subjected to flexural loadings. It is also necessary for the material at the heart of the component to maintain a suitable level of resilience.

In order to achieve this result one known means is to produce a blank made from a weakly alloyed steel, with a carbon content of between 0.10 and 0.20% to enrich the surface of the blank with carbon by carburizing under a suitable gaseous atmosphere at a temperature of 900°-935° C., and then to quench the entire component in gas, oil or water containing additives.

This then yields a through-hardened component in a weakly alloyed material with a low carbon content which has its surface very much enriched with carbon. The component exhibits a hardness gradient from the surface toward the core of the material.

This technique offers the advantage that it can be made to suit any shape of component and that it is effective. However, it does require a treatment time that can prove lengthy. Further, the manufacturing schedule is generally complex insofar as it is necessary to mask off certain areas by electrolytic copper plating—entailing operations of applying and removing the copper plating or "hard machining" operations—which require lengthy and expensive machining processes. In addition, because this method requires the entire component to be quenched, whole-component deformation has to be anticipated and rectifying machining work has to be performed on numerous zones of the component. Likewise, it is necessary to plan for grinding machining operations on the hardened functional zones such as the tooth sets or the splines.

Another known means is induction contour hardening. For that, use is made by way of base material of a steel that has a carbon content that is higher than in the previous technique, exceeding 0.4%. For example, the blank is made of an alloy reference 60Cr4 with a carbon content ranging from 0.56 to 0.64%. Creating the blank entails machining the tooth set in particular. A selective induction hardening operation is then performed. This operation consists in heating only the zones that are to be hardened, using an induction heating means arranged along the contour of the component and in proceeding with a hardening operation. This then yields a component which is surface hardened but not through-hardened, with contour hardening. Because the component does not undergo any carburizing treatment, the carbon content is unchanged by the treatment and remains the same at the core as it is on the surface.

This method is quick to implement, requires no masking and the hard machining is restricted to the finish grinding or surface grinding of the hardened zones. By selective hardening, no deformation in the non-hardened zones is caused. However, it does have the disadvantage of not always performing well and of being difficult to optimize. Further, it is necessary to use high-frequency generators which are expensive and on the other hand it is necessary to create a specific tooling per component and per zone that is to be treated, and hence represents a high cost of investment.

SUBJECT OF THE INVENTION

The subject of the present invention is a method that does not have the disadvantages of the methods of the prior art.

Thus a first subject of the invention is a method that makes it possible to obtain surface hardening of the contact zones, improving slip and life.

Another subject of the invention is a hardening treatment over a depth of the order of one millimeter in order to carry the operating loads, notably the tooth set in the case of a gearwheel.

Another subject of the invention is a method that avoids through-hardening the component in order that resilience be maintained.

A final subject of the invention is the creation of a component having zones that are not hardened.

According to the invention, these objectives are achieved with a method of manufacturing a mechanical component made of steel with hardening of surface zones, characterized in that it comprises, starting from a blank of the component, the following steps of carburizing followed by a cooling without quenching, of induction heating of said zones up to the austenitizing temperature of the steel, and of quenching.

By enriching the surface with carbon and selectively quenching the zones that are to be hardened, the surface properties of the carburized zones are preserved while at the same time simplifying the heat treatment scheduled. Furthermore, by selective hardening it is possible to avoid deforming the entire component and the schedule made up of the machining steps is simplified. Specifically, the schedule of the invention does not require any "hard machining", meaning machining in which the hardness is high following a carburizing and a quenching treatment of the non-functional zones. No masking that would require, on the one hand, copper-plating operations prior to heat treatment and then copper-plate removal operations after the heat treatment operations is required.

According to another feature, the material is a steel with a carbon content of at least 0.3%.

The steel used, because the core is not hardened, remains resilient while at the same time, because of the carburizing, being able to be enriched to enough of an extent to impart the desired hardness. Thus, according to another feature, the carbon content of the surface is at least 0.7%.

The invention applies in particular to the manufacture of a gearwheel. For preference, the induction heating of the blank is then applied over the entire depth of the tooth set. One advantage of "full tooth" induction hardening is that it is easy to implement because there is then no need to apply the heating with any particular precision, unlike in contour hardening.

The method thus makes it possible to create gearwheels with a surface hardness of at least 680 HV, and a core hardness of between 100 and 400 HB.

BRIEF DESCRIPTION OF THE FIGURES

The invention is now described in greater detail with reference to the attached drawings in which:

FIG. 1 is the depiction of a gearwheel with its various zones that need to be hardened;

FIG. 2 is a schematic cross section of the structure of the tooth set of a gearwheel after the entire component has been carburized and quenched;

FIG. 3 is a schematic cross section of the structure of the tooth set of a gearwheel after what is known as contour hardening;

FIG. 4 schematically shows the structure of the tooth set after the treatment of the invention.

DESCRIPTION OF THE INVENTION

According to the invention, a steel bar is machined, forged or converted in a suitable way to obtain a blank of the component that is to be manufactured. The steel used has a low carbon content. This is, for example, of the order of 0.3%. In the case of a gearwheel, the peripheral tooth set is machined. So are the other zones that are to be hardened. In the case of a gearwheel as depicted in FIG. 1, the cylindrical part that forms the support for the rolling bearing and the splines for transmitting driving load rotationally between a shaft and the gearwheel are advantageously machined in the blank prior to the hardening heat treatment or thermochemical treatment that will follow.

Once the blank has been prepared, it is subjected to a diffusion treatment aimed at increasing, notably up to around 0.8%, the carbon content in the surface layers over a desired depth. The aim here is to increase the carbon content in the zones that are to be hardened. The treatment may be a conventional one, for example carburizing in a furnace under a partial pressure in the case of the known technique of low pressure carburizing LPC, or at atmospheric pressure in the case of the known technique of gas carburizing in a controlled flow of a reactive gas mixture. For example, in the case of LPC, the carburizing process involves the following steps of
evacuating the chamber,
heating under vacuum, by radiation or other equivalent means, gradually in stages with homogenization soaks up to the carburizing temperature,
injecting the carburizing gaseous mixture under controlled partial pressure in the case of LPC, and at a controlled mass flow rate,
a succession of diffusion and carburizing sequences, according to the desired depth and profile.

The invention is not restricted to this thermochemical treatment mode. Any mode of treatment that achieves this result will suit. Thus, in the case of gas carburizing, the heating is the conventional one.

The component is then gradually cooled down to ambient temperature. It should be noted that the cooling rate is chosen according to the amount of through-hardening that it is desired the component should have. For preference, the cooling rate is sufficiently removed from the quench rate that a non-through-hardened state is achieved.

The next step is to heat the component locally in the desired zones by magnetic induction up to the austenitizing temperature of the steel, then to quench.

Electromagnetic induction hardening is a method known per se making it possible to obtain uniform rapid heating over a controlled and reproducible depth from 0.5 mm to several centimeters. The ferromagnetic material component is placed inside a solenoid through which a high-frequency, medium-frequency or low-frequency AC current passes. This solenoid, with the component, behaves like a transformer and develops an induced current within it. The heating effect at the periphery of the component is very rapid.

Induction contour hardening uses high-frequency currents the associated frequencies of which range between 20 and 600 kHz, and requires a generator with a power in excess of 100 kW.

Medium-frequency induction surface hardening uses a medium-frequency current generator with a power of the order of 50 kW and the associated current frequencies of which are of the order of 10 kHz.

Low-frequency induction surface hardening uses a low-frequency current generator with a power below 1 kW and the associated current frequencies of which are below 1 kHz. The choice of generator is generally dependent on the chosen depth of treatment.

After heating, the component is immersed in a quenching fluid, generally water incorporating one or more suitable additives.

Within the context of the invention, this differs from the electromagnetic induction hardening technique referred to as contour hardening.

It will be recalled that the contour heating of a gearwheel involves placing this gearwheel within the alternating magnetic field of a single-turn or multi-turn inductor coaxially surrounding the toothed periphery of this gearwheel in order to create an axial field. The alternating field with which the inductor is supplied for a contour hardening of tooth sets is generally a high-frequency field, with a frequency ranging from 20 to 600 kHz, with a current generator of a power in excess of 100 kW.

What the invention is proposing is low-frequency or medium-frequency hardening because the invention proposes to achieve surface hardening that does not, however, exactly follow the contour of the tooth.

Thus, according to the invention, what is referred to as "full tooth" induction heating is performed whereby surface hardening is achieved that does not follow the exact contour of the tooth set. The heating is not as accurate but can be carried out by a low-frequency or medium-frequency current generator. The heating is easier to optimize because the currents do not have to follow the contour of the tooth.

Following heating, the component is subjected to a quench, for example being quenched in water.

FIGS. 2, 3 and 4 depict the effects of the various treatment modes, the first two corresponding to the prior art and the third to the invention.

The tooth set 5 of FIG. 2 has a carburized state in the surface layer 51. The component 3 is through-hardened. Use is made of an alloy steel with a low carbon content of 0.15%. Through the carburizing process the carbon content in the surface layer reaches 0.8%.

The tooth set 5' in FIG. 3 has a surface layer 51' which is hardened by induction contour hardening. This surface layer may be relatively thick. In order to maintain a certain level of toughness within the core, the steel has a higher carbon content than before, namely 0.6%. The content is the same throughout the component.

The tooth set 5" in FIG. 4 has a carburized surface layer 51" the surface carbon content of which is high at 0.8%. Because of the induction hardening applied to the entire tooth set, the whole of this part 52" formed by the whole of the teeth from the tips to the root and the gullet between two adjacent teeth has a hardness greater than that of the underlying part of the disk. The material is not through-hardened.

The invention claimed is:

1. A method of manufacturing a steel toothed gearwheel with a phase of hardening surface zones, comprising:
    creating a blank of the gearwheel, the gearwheel including a tooth set that is to be hardened; and then
    carburizing a surface layer of the tooth set, the carburizing of the surface layer being followed by a cooling without quenching;
    localized induction heating using at least one medium-frequency or low-frequency current generator, which is applied to an entire depth of the tooth set of the gearwheel from a tip to a root of each tooth of the tooth set and to a gullet between adjacent teeth of the tooth set, to an austenitizing temperature of the steel; and
    quenching.

2. The method as claimed in claim 1, wherein the localized induction heating is completed using only the at least one medium-frequency or low-frequency current generator such that a high-frequency generator is not used.

3. The method as claimed in claim 1, wherein, after the quenching, the gearwheel has a surface hardness of at least 680 HV.

4. The method as claimed in claim 1, wherein, after the quenching, a hardness of a portion of the tooth set beneath the carburized surface layer is at least 450 HB.

5. The method as claimed in claim 1, wherein, prior to the quenching, a hardness of a core of the gearwheel is between 100 and 400 HB.

\* \* \* \* \*